(No Model.)

T. LONERGAN.
BEDSTEAD BRACE.

No. 458,287. Patented Aug. 25, 1891.

WITNESSES:
A. E. Glascock.
M. E. Lansdale.

INVENTOR
Thomas Lonergan
BY
John L. Duffie
ATTORNEY.

UNITED STATES PATENT OFFICE.

THOMAS LONERGAN, OF BEEBE, ARKANSAS.

BEDSTEAD-BRACE.

SPECIFICATION forming part of Letters Patent No. 458,287, dated August 25, 1891.

Application filed April 22, 1891. Serial No. 389,902. (No model.)

*To all whom it may concern:*

Be it known that I, THOMAS LONERGAN, a citizen of the United States, residing at Beebe, in the county of White and State of Arkansas, have invented certain new and useful Improvements in Bedstead-Braces; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to bedstead-tighteners; and it consists in the novel construction and arrangement of its parts.

Figure 1:
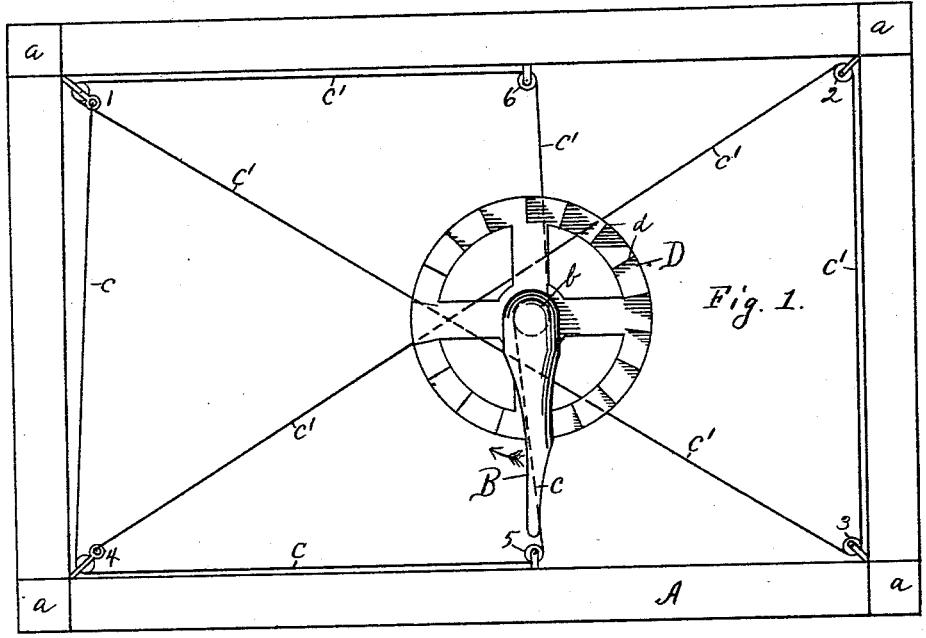
Figure 2:
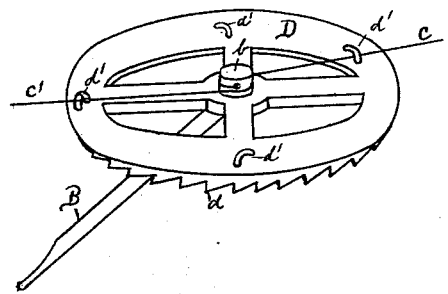

In the accompanying drawings, Figure 1 is a bottom view of a bedstead with my invention attached thereto. Fig. 2 is a detail view.

My invention is described as follows: It consists of a bedstead A, having the posts $a$, and in said posts are secured the pulleys 1, 2, 3, and 4, respectively, and near the middle of the sides of the bedstead are the pulleys 5 and 6, respectively. Attached to the pulley 1 is one end of a rope $c$, which passes around the pulleys 4 and 5, and attached to the pulley 4 is one end of a rope $c'$, which passes around the pulleys 2, 3, 1, and 6. The free ends of these ropes are wound around a spool $b$, rigidly attached to the lever B. Said spool passes through a perforation in the center of a wheel D, said wheel having on its under side the ratchets $d$, adapted to catch and hold the lever B, and on its top side the hooks $d'$, adapted to catch the ropes $c$ and $c'$.

My invention is operated as follows: When the bedstead becomes loose, the lever B is turned around to the right. (See Fig. 1.) This winds the ropes $c$ and $c'$ around the spool $b$, and consequently the posts $a$ are drawn nearer together and firmly braced. The lever B is then allowed to catch in the ratchets of the wheel D, said wheel being held in a stationary position by the hooks $d'$, engaging the ropes.

This brace is not confined to bedsteads, but may be used on any article of furniture, such as chairs, sofas, &c.

Having described my invention, what I claim as new, and desire to secure by Letters Patent, is—

1. In combination with a bedstead A, having the posts $a$, the pulleys 1, 2, 3, 4, 5, and 6, attached to said bedstead, cord $c$, one end attached to pulley 1, then passing around pulleys 4 and 5, cord $c'$, one end secured to pulley 4, then passing around the pulleys 2, 3, 1, and 6, perforated wheel D, having on its under face the ratchets $d$ and on its upper face the hooks $d'$, and lever B, having rigidly secured to it the spool $b$, adapted to pass through the perforation of said wheel and wind the cords $c$ and $c'$, substantially as described.

2. In combination with a bedstead A, provided with suitable pulleys and cords working around said pulleys, the perforated wheel D, having on its under face the ratchets $d$ and on its upper face the hooks $d'$, and lever B, having rigidly secured to it the spool $b$, adapted to pass through the perforation of said wheel and wind the cords $c$ and $c'$, substantially as described.

In testimony whereof I affix my signature in presence of two witnesses.

THOS. LONERGAN.

Witnesses:
JOSEPH CRAMER,
H. N. BEAM.